United States Patent Office 3,117,289
Patented Jan. 7, 1964

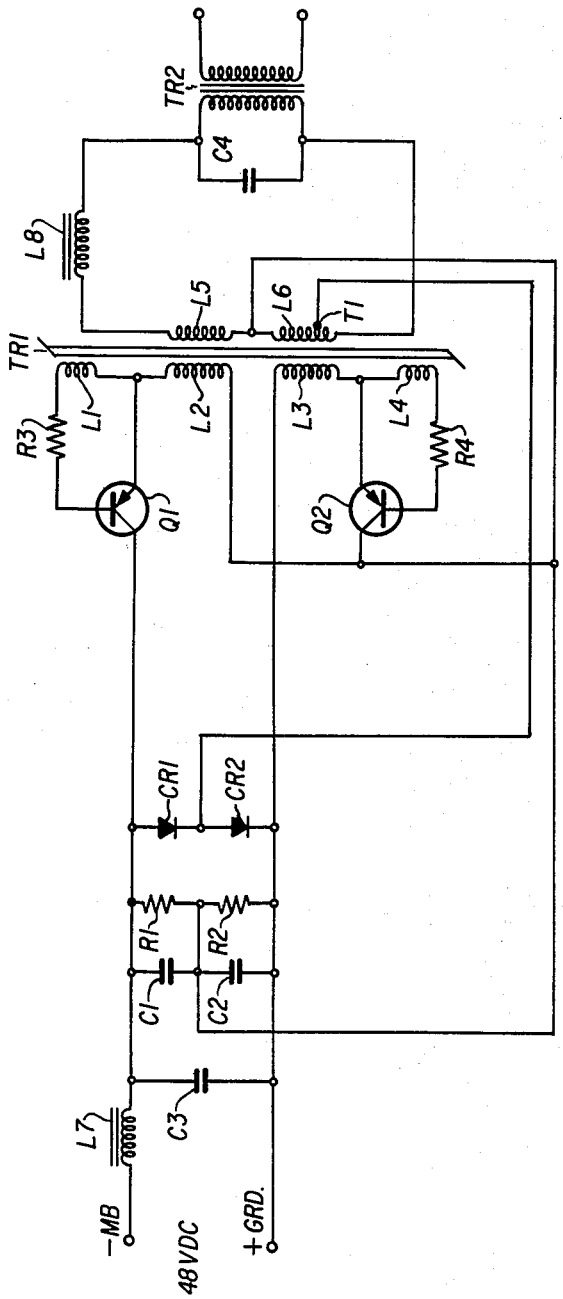

3,117,289
TRANSISTOR TONE GENERATOR
Otho D. Grandstaff, Oak Park, William A. Alden, St. Charles, and Russell C. Fischer, Chicago, Ill., assignors to Automatic Electric Laboratories, Inc., Northlake, Ill., a corporation of Delaware
Filed Aug. 7, 1961, Ser. No. 129,867
4 Claims. (Cl. 331—113)

This invention relates to an inverter using transistors for obtaining an alternating current output from a direct current supply and is more particularly concerned with controlling the voltage balance to the switching components of such converters.

Transistor power inversion circuits provide a convenient means for obtaining alternating current from a direct current supply and are finding increasing use on account of their high efficiency. One well known inversion circuit, sometimes referred to as a ferroresonant transistor oscillator, utilizes a saturating transformer having a core with a rectangular hysteresis characteristic as the frequency determining element. The D.C. supply voltage is switched with alternating polarity across the primary winding of a saturable transformer by the transistors. This produces a substantially rectangular wave pattern whose half-cycle period is proportional to the time required for the transformer core to become magnetically saturated after each reversal of the conducting conditions of the transistors. The time required is inversely proportional to the magnitude of the voltage of the D.C. supply source. Consequently the frequency of the alternating voltage output is directly proportional to the D.C. voltage. For some applications, this is a disadvantageous characteristic. For instance in the application where the two transistors of the oscillator are fed an operating voltage from the two halves of a voltage divider of a higher voltage power source. Under such conditions an increased voltage to one of the transistors would cause it to conduct a greater current and thereby saturate the transformer core at a faster rate, with the resultant shorter pulse. This condition is encountered in a conventional telephone system where the available direct current supply is 48 volts. This voltage is available to practically all of the equipment units and it is therefore advantageous in designing equipment for use in such systems to have it operate from this source. In order to take advantage of this source and still use the low voltage transistors a voltage dropping resistor must be used, however to obtain good voltage regulation very low resistances must be used as current bleeders across the supply.

Accordingly it is an object of this invention to provide a novel balancing arrangement for a voltage divider power supply of a tone generator which does not require excessively low bleeder resistances.

Other objects and features of the present invention will become apparent from the following description thereof as developed in connection with the detailed description of an embodiment illustrating its principles. The features of the invention believed to be novel will be more particularly pointed out in the appended claims.

The drawing is a schematic circuit diagram of the transistor oscillator circuit with the novel voltage balancing arrangement in accordance with the present invention.

Oscillator

The oscillator circuit basically consists of a toroidal coil with a square hysteresis loop core and two transistors.

The transistors operate on an "On-Off" basis to obtain a square wave A.-C. output voltage from a D.-C. source. The transistors are switched "On" and "Off" by control windings L1 and L4. When one transistor is "On" (conducting) the other is biased "Off."

Assume that Q1 is switched "On." This allows current to flow through L2 causing a voltage to be induced in each winding. Q1 remains "On" and Q2 remains "Off" while current continues to flow in L2. Flux increases in the core until it abruptly saturates. When this occurs, the induced control voltages fall to zero and both Q1 and Q2 are turned "Off." With no current to produce flux, the magnetic field starts to collapse; changing the direction of the induced voltages. Reversal of the voltages in control windings L1 and L4 causes Q1 to be biased "Off" and Q2 to turn "On." Now current flows through L3 and transistor Q2; causing voltages of opposite polarities to be induced in all windings. This current continues to flow until the core saturates again, completing one cycle of operation.

Input Filter

The input filter consists of a choke L7 and capacitor C3 which are provided to prevent high frequency harmonics, produced by the tone generator, from being superimposed onto the supply battery. If these harmonics were not suppressed, they would interfere with telephone transmission.

Input Voltage Divider

Resistors R1 and R2 are elements of a voltage divider and serve as discharge resistors for capacitors C1 and C2. It was found that these resistors needed to be low with undesirable waste of power to properly equalize the voltage on the two capacitors. A novel feature was added that is very effective in maintaining a balance of voltage with little power loss, using diodes CR1 and CR2 and a tap T1 on the output winding of TR1. The tap is positioned so that its peak voltage is equal to the D.-C. voltage across C1 or C2 when the input voltage is equally divided. If the voltage across C1 becomes larger, current flowing from C1 through the primary winding of TR1 and transistor Q1 induces a voltage at the tap that is positive with respect to the center of the secondary winding. This voltage will exceed the voltage across C2, therefore current will flow through diode CR2 to raise the voltage of capacitor C2. In similar manner when the voltage on C2 is too high, current will flow through diode CR1 to the tap to raise the voltage on capacitor C1. This circuit proved very effective in maintaining a close voltage balance on capacitors C1 and C2.

Diodes CR1 and CR2 also serve for another function. In a low impedance input transistorized device of this type, the transistors can be instantly damaged by application of reversed battery potentials to its input. Under such condition these diodes would carry a current of several amperes to blow the fuse in the battery supply while the forward voltage drop across the diodes and the device remains safely low.

Output Circuit

The output circuit consists of an output transformer TR2 in series with an inductance L8 driven by the secondary of the oscillator transformer TR1. The inductance along with the capacitor C4 comprise a filter to provide a sinewave output at the output transformer secondary.

While there has disclosed what is at present considered to be the preferred embodiment of the invention, other modifications will readily occur to those skilled in the art. It is not, therefore, desired that the invention be limited to the specific arrangement shown and described, and it is intended to cover in the appended claims all such modifications as fall within the true spirit and scope of the invention.

What is claimed is:

1. In combination with a saturable core-transistor oscillator having a tapped output winding on said core, a pair of transistors and a power supply with a voltage divider including a pair of condensers bridged across said power supply, each transistor having base, collector, and emitter electrodes, means comprising the connections of certain of the electrodes of each of said pair of transistors across a separate one of the condensers of said voltage divider whereby each transistor operates from a different portion of the voltage drop across said divider, and including a second means comprising a pair of diodes serially connected across said voltage divider with their common junction connected to said output winding tap to balance the voltage across said condensers, said diodes poled in a nonconducting direction to the normal polarity across said voltage divider.

2. In combination with a saturable core-transistor oscillator having primary windings and a tapped output winding on said core, a power supply, a pair of transistors having base, emitter and collector electrodes and a two resistor voltage divider connected across said power supply with a condenser in bridge of each resistor, said output winding tap so positioned that the voltage to it is equal to one half the voltage across said voltage divider, means comprising the connections of each of said pair of transistors across a separate one of said two resistors whereby each transistor is supplied an operating voltage from a separate part of the voltage drop across said divider, and a means to maintain a voltage balance between the voltage drops across each resistor comprising a pair of diodes serially connected across said condensers and said resistors of said voltage divider with their common junction connected to said output winding tap, said diodes poled in a non-conducting direction to the normal polarity across said voltage divider.

3. In combination: a voltage source having two terminals, a first and second capacitor serially connected across said terminals, a first and second resistor serially connected across said terminals, the junctions of said capacitors and of said resistors connected together; and a ferroresonant oscillator comprising a first and second transistor each having a collector, emitter and base element, a transformer having a saturable magnetic core member and a pair of first and second windings, each of said first and second transformer windings connected together and having an intermediate tap, means connecting the emitter of each of said transistors to one of said first and second transformer winding taps, a pair of resistors, each of said resistors connected between one of said base elements and one end of each of said second transformer windings, said collector element of said first transistor connected to one of said terminals, one end of one of said first windings connected to the junction of said capacitors and resistors and to said second transistor collector element, the end of said other first transformer winding connected to the other terminal of said voltage source, and a third transformer winding including a center tap and an intermediate tap, the terminals of said third winding comprising the output, said third winding center tap connected to said junction of said capacitors and resistors, and means including a pair of diodes serially connected across said terminals and a connection from said intermediate winding tap to the junction of said diodes whereby a balance is maintained in the voltage drops across said two resistors.

4. A transistor inverter including a saturatble core transformer, a power supply therefor including a source of power having a pair of terminals with a pair of condensers and a pair of diodes connected in series across said terminals, a plurality of primary windings and a secondary winding on said core, a pair of transistors having base, emitter, and collector electrodes connected with said primary windings, said condensers and diodes connected to said primary windings and transistor electrodes so as that each transistor operates on a different half of the voltage drop across said condensers to energize said primary windings alternately, an intermediate tap on said secondary winding, and a connection from said intermediate tap to the junction between said pair of diodes, said center tap and said connection maintaining a voltage balance across said condensers.

References Cited in the file of this patent

UNITED STATES PATENTS

| | | |
|---|---|---|
| 2,967,989 | Eno et al. | Jan. 10, 1961 |
| 3,009,115 | Johnson | Nov. 14, 1961 |
| 3,015,771 | Mesenhimer | Jan. 2, 1962 |
| 3,044,023 | Floyd | July 10, 1962 |